United States Patent

[11] 3,624,371

| [72] | Inventors | Norman D. Neal<br>Cincinnati;<br>Harold D. Wiebe, Sharonville, Ohio;<br>Herbert M. Fuldner, Ft. Thomas, Ky. |
|---|---|---|
| [21] | Appl. No. | 61,703 |
| [22] | Filed | Aug. 6, 1970 |
| [45] | Patented | Nov. 30, 1971 |
| [73] | Assignee | Cincinnati Milacron Inc.<br>Cincinnati, Ohio |

[54] APPARATUS FOR GENERATING AND RECORDING A PROGRAM AND PRODUCING A FINISHED PART THEREFROM
6 Claims, 3 Drawing Figs.

[52] U.S. Cl.................................................235/151.11,
318/568
[51] Int. Cl......................................................G05b 19/42
[50] Field of Search..........................................235/151.11;
318/568

[56] References Cited
UNITED STATES PATENTS
| 2,996,348 | 8/1961 | Rosenberg..................... | 318/568 X |
| 3,178,716 | 4/1965 | Slatin ..........................235/151.11 UX |
| 3,254,203 | 5/1966 | Kveim .......................... | 235/151.11 |
| 3,292,495 | 12/1966 | Hill et al. ......................235/151.11 UX |
| 3,559,021 | 1/1971 | Bingham ..................... | 318/568 |

*Primary Examiner*—Eugene G. Botz
*Assistant Examiner*—R. Stephen Dildine, Jr.
*Attorneys*—Howard T. Keister and Alfred J. Mangels ABSTRACT: An automatic machine tool and control system having the ability to first generate and record in a storage medium a desired part configuration defined by a model, and second, to drive the machine tool in response to an interrogation and decoding of said storage medium thereby cutting the desired part configuration in a workpiece. The system is comprised of a machine tool having three mutually perpendicular axes of motion under servomechanism control. A tracing head is adapted to the machine tool, and tracing head outputs are coupled through servomechanism control circuits in a standard numerical control to an input of a computer. Also connected to the computer is an input/output device which allows for general control over the process and permits the input of auxiliary commands. The computer is responsive to its inputs and generates a part program defining the desired part configuration as represented by the model. An output of the computer is connected to an encoding device which records the part program in the storage medium. The part program may be played back by interrogating and decoding the storage medium with the numerical control input circuits. Hence, the machine tool is controlled in a standard fashion to cut a finished workpiece corresponding to the model traced.

APPARATUS FOR GENERATING AND RECORDING A PROGRAM AND PRODUCING A FINISHED PART THEREFROM

BACKGROUND OF THE INVENTION

The numerical control art is now over 20 years old.

The art grew from the necessity to have a complex control over machine tool motions that was unattainable by hand control or hydraulic controls then available. The hydraulic controls allowed one to establish a fixed pattern of motion or a particular cycle, but it was not feasible to readily obtain a large number of independent patterns of motion. However, with the development of numerical control, it has become possible to obtain a large variety of cycles of motion by merely changing the input or program to the control.

Throughout the years of development, the complexity of machine tools as well as numerical controls has grown rapidly. For example, the original controls only had the ability to control two machine motions which were simultaneous but independent from each other. The object was to move the tool from one point to another relative to the workpiece. However, one could not move the tool through a predetermined path in space between the two points but could only reliably define the end points themselves. Today, there are machines having up to 10 independent axes of motion that can be controlled simultaneously to move a plurality of tools through any predetermined path in space. Although tremendous strides have been accomplished in automatically moving the tool relative to the workpiece, the implementation of such automation has given rise to a whole new industry—Part Programming. The part programmer is necessary to define the part geometry or the predetermined path in space in a language that is meaningful to the control and machine. This exercise must be executed for every different part configuration to be machined and must be reexecuted when a different brand of machine is to be used. Standardization in the industry has been very limited. Therefore, automation of machine tools has not only created a whole new industry of numerical control development and manufacture, but the programming industry has been substantially broadened. Today it is recognized as having a higher priority than the development of the numerical control itself. Thus, while the control industry was growing rapidly, the software industry was mushrooming explosively. As software facilities grew, the process or mechanics for generating a program became much more complex. In many cases today, the programmer's production is more dependent on the efficiency of the system in which he must produce than it is on his own ability. Today he is part of a very complex system over which he has little control but a large degree of responsibility. A recent survey by an aircraft manufacturer indicated that on an average a part program passed through 20 different work stages in the process of preparation; and further, said program averaged approximately six iterations through the preparation loop. Ignoring the programmer's time, the average cumulative response time of the other operations in the system was 12 days. Couple the above with the fact that there is a continuous shortage of skilled programmers, and it is readily obvious that the development of a low-cost apparatus for automatically and quickly producing part programs would be a boon to the industry.

Applicant proposes an apparatus for solving the above problems in a great many applications. These applications are the situations where the finished part is represented by a two-dimensional template or a three-dimensional model. Applicant proposes to add a tracing unit, a computer with an input/output device and an encoding device to the combination of a standard numerical control and machine tool. Applicant further proposes to interface said additional apparatus to the standard numerical control equipment in a manner taking fullest advantage of the electrical networks existing in said numerical control. The system proposed by applicant has the ability to trace a model and produce a permanent record as defined by the model geometry. Further, said record may be used in the numerical control at any time to produce the finished part. In addition, the input/output device on the computer allows the programmer to insert supplemental or correct existing information. The apparatus proposed by applicant almost totally eliminates the need for a skilled programmer in these applicants. Further, a permanent record may be produced in a single step in the time it takes to trace the model. This is many days faster than it would take a programmer to create a program through existing systems.

The system has one further advantage that being the ability to inspect production parts. This is accomplished by tracing the model and selecting critical points to be recorded by the computer. These points are then printed out by the input/output device for subsequent inspection. The inspection is executed by using the permanent record to drive the numerical control and machine tool combination and comparing the machine tool position on the finished part to be checked with the printed points.

Applicant recognizes that other tracing machine have been developed for making part programs. However, these machines are designed exclusively for that purpose and are approximately an order of magnitude more complex and more expensive than the apparatus disclosed. Applicant proposes a unique combination of elements using to a large extent circuits now available in existing numerical controls. It should be further noted that the application of the disclosed apparatus is not limited to a particular control manufacturer but is applicable to a great majority of the controls being manufactured today. It should further be noted that when applied to a given control system, part programs may be made for use on a control system of other manufacturers. Applicant has made a significant step in alleviating a problem that has existed since the advent of numerical control and which has been a substantial burden in the last 5 years.

DESCRIPTION OF THE PREFERRED EMBODIMENT

Figure 1A:
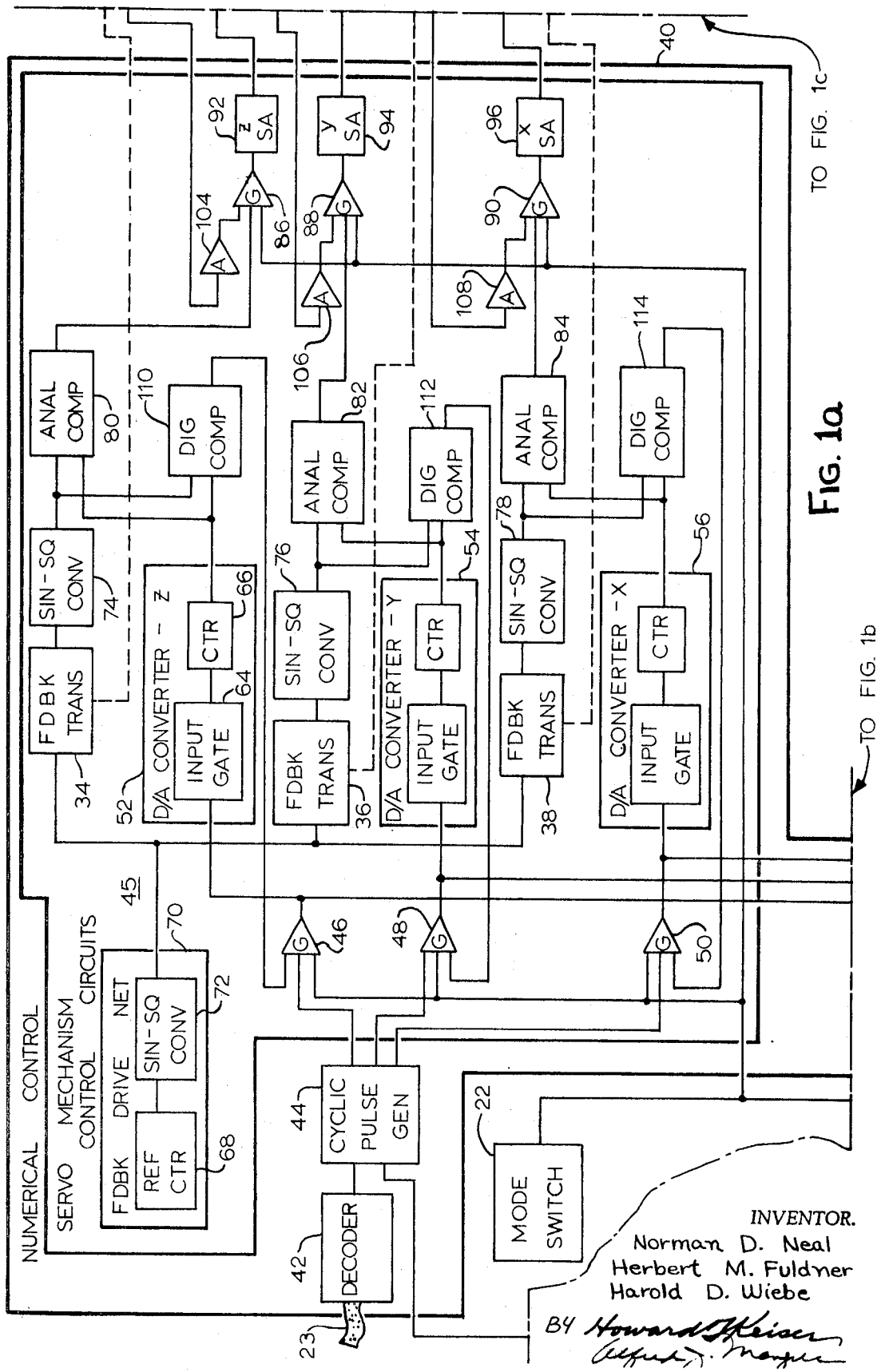
FIGS. 1a, 1b, and 1c when joined along the indicated junction lines comprise a detailed block diagram illustrating applicant's invention.
Figure 1C:
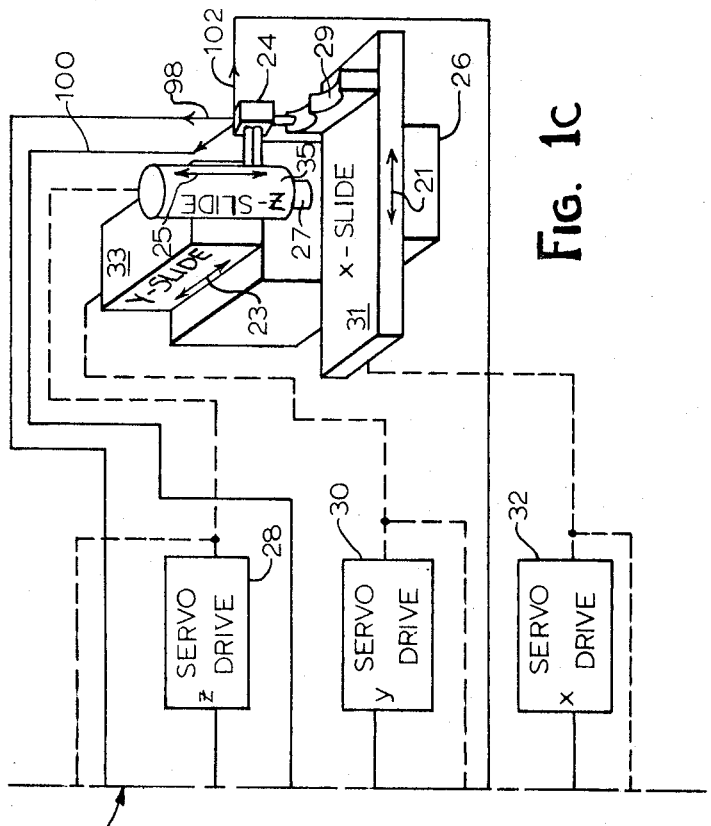
Figure 1B:
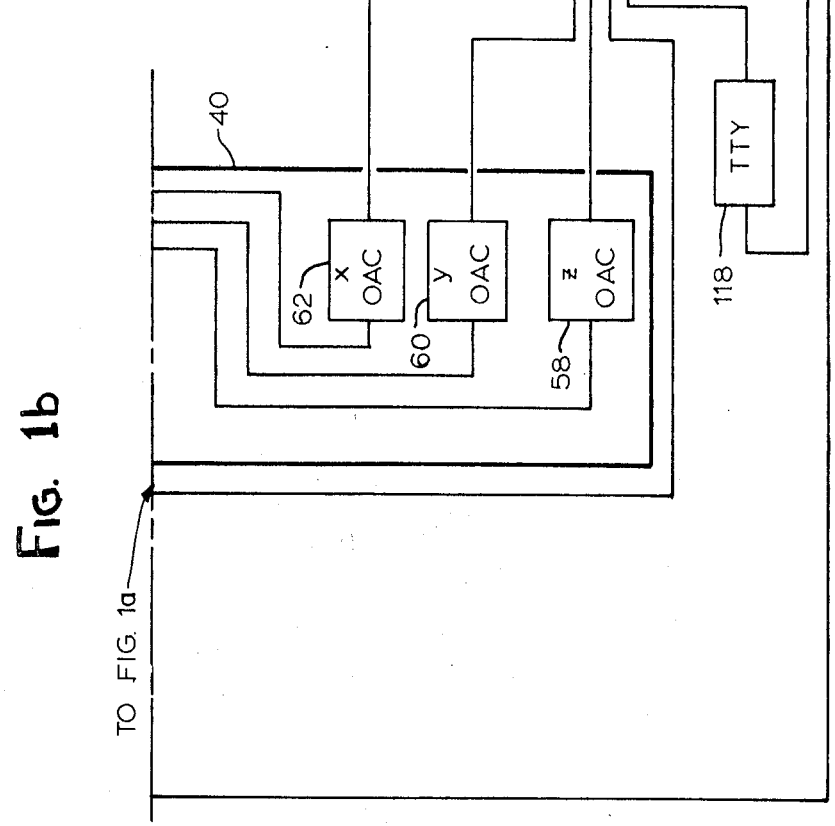

FIGS. 1a, 1b and 1c comprise a detailed block diagram of the preferred embodiment of applicant's invention. In FIG. 1c, a three-dimensional tracing head 24 is mechanically adapted to a machine tool 26. The machine tool 26 has three mutually perpendicular and independent axes of motion 21, 23 and 25 as defined by the machine slides 31, 33 and 35 respectively. The tracing head 24 and machine tool 26 are both commercially available items. The machine too being more widely available, and its three axes configuration being standard throughout the industry. It would be possible to adapt the tracing head 24 to the spindle 27 of the machine 26 and place the model 29 on the machine table 31 in an area normally occupied by a workpiece. However, for reasons to become apparent later, the preferred embodiment requires that the tracing head 24 by adapted to the machine 26 in a more conventional manner. It is mounted adjacent to the spindle 27 of the machine 26 allowing the spindle 27 to operate in parallel with the tracing head 24.

As indicated by the dashed lines, servo-drives 28, 30 and 32 are mechanically connected to the machine 26. If the servo-drive is hydraulic, it typically will consist of a servo-valve and rotary motor coupled with a lead screw which is connected to the machine slide. It is possible to use a piston cylinder arrangement instead of the rotary motor and lead screw. It is also possible to have an electric drive instead of a hydraulic drive. In any case, the servo-drives 28, 30 and 32 provide the forces necessary for relative motion between the machine slides. Such drive systems are well known in the art and are commercially available. Also mechanically coupled to each of the machine slides are feedback transducers 34, 36 and 38 shown in FIG. 1a. Again these transducers are commercially available and used in their convention manner. They may take the form of linear or rotary devices.

With two exceptions, a typical numerical control is defined by the elements enclosed within the box 40 of FIGS. 1a and 1b. The exceptions mentioned will be discussed later. For purposes of this disclosure, two modes of system operations will be defined—tracer operation and tape operation. These modes may be selected by mode switch 22. Assume the mode switch is 22 is set to select the tape operation mode. The most common input to a numerical control is a punched tape 23. This consists of a perforated medium with the perforations being divided in an orderly column and row arrangement, and intelligence being entered thereon by a code defining a pattern or perforations. The punched tape is read, and the information thereon decoded into electric signals by the decoder 42. The signals are an input to a cyclic pulse generator 44. The configuration of the generator 44 may vary substantially from one control manufacturer to another. However, it is the output therefrom that is important, and it is not significant how that output is generated. The output generally takes the form of a string of pulses for each axis of motion. Each pulse is weighted to represent a fixed increment of machine slide motion. Further, the rate or frequency of the pulses is directly proportional to the rate of travel of the respective machine slide. Therefore, the outputs from the pulse generator 44 are a plurality of strings of pulse representing digital expressions which if taken cumulatively define the magnitude and velocity of tool motion relative to the workpiece. The generator 44 also produces a second output signal for each axis which represents the sign or direction of motion. The outputs from the cyclic pulse generator 44 define an input to the servomechanism control circuits 45. Within the control circuits 45, the generator outputs pass through gates 46, 48 and 50 into the digital analogue (D/A) converters 52, 54 and 56 and output accumulators 58, 60 and 62 in FIG. 1b. The accumulators 58, 60 and 62 represent a first exception to a typical numerical control. Although most newer controls contain output accumulators, they were unnecessary in a number of earlier controls. In these situations, they must be added for the application of applicant's invention. An output accumulator may consist of a shift register or other storage medium which keeps an accurate and running account of the total distance moved by a slide with respect to a reference position or origin. The accumulators are operative regardless of the operation mode selected, and consequently allow one to switch between modes without losing alignment between the control, the computer and the machine. They are of a standard serial input parallel output design. The serial input design is most economical and most readily interfaces with the output from the pulse generator 44. The parallel output is the most economical interface with the computer.

Also receiving the pulse generator outputs are the D/A converters 52, 54 and 56, which may provide an amplitude or phase-modulated analogue signal on their output. Both systems have a substantial history in the art; although today, phase modulation is most often used. In this case, a typical converter 52 consists of an input gate 64 and a counter 66. The counter 66 is driven by a relatively high frequency oscillator (not shown) such as the numerical control clock; and with no gate input, it produces a relatively low frequency square wave output. The input gate 64 allows for an addition or subtraction of a count in the counter 66 in response to the outputs from the generator 44. The sign or direction of movement determines the addition or subtraction of a count. The pulse train from the generator 44 operates as a command pulse that initiates the counter update.

Operating simultaneously with the D/A converters is a reference counter 68 which is part of the feedback transducer drive network 70. With no inputs to the D/A converters, the output of the reference counter 68 will be identical to and synchronized with the outputs from the D/A converters. Again, as is well known to those who are skilled in the art, the output of the reference counter 44 is shaped by the square to sine converter 72 into two sine waves 90 degrees out of phase and input to the feedback transducers 34, 36 and 38. The feedback transducer produces feedback signals which are squared by the sine to square converters 74, 76 and 78 and input respectively to the analog comparators 80, 82 and 84. Another input to each of the comparators 80, 82 and 84 is the analogue signal from the D/A converters 52, 54 and 56 respectively. As described earlier, as pulses are inputed to the converters from generator 44, the phase of the counter outputs is shifted proportionally. The comparators 80, 82 and 84 detect the phase shift relative to the output from the feedback transducers and produce output analogue signals proportional thereto. The output analogue signals from each of the comparators 80, 82 and 84 pass through corresponding gates 86, 88 and 90 and into respective servoamplifiers 92, 94 and 96. These amplifiers provide a signal level sufficient to drive their respective servo-drives which in turn move the machine slides and hence the feedback transducers. A mechanical input to the feedback transducers results in their outputs shifting phase in a direction to correspond with the phase-shifted outputs from the D/A converters. When the outputs from the feedback transducers are in phase with the outputs from the D/A converters, the outputs from the comparators cease; and the machine slides have moved to the commanded position. Said position being indicated by the accumulators. The process described thus far is old in the art and represents the most generally used programmed numerical control. However, an understanding of basic numerical control principles is necessary to fully appreciate applicant's proposed combination of elements.

The disclosure has thus far described how the machine is controlled in response to a given input program. The disclosure will now explain how the program can be generated using many elements existing in the numerical control 40. First, the tracing mode switch 22 is moved from the tape operation position to the tracer operation position. The operator then begins to move the tracing head 24 of FIG. 1c over the contour of the model 29. The tracing head 24 has a transducer producing three electrical output signals 98, 100 and 102 corresponding to each machine slide motion and representing the magnitude of deflection therein. The direction of motion for each slide motion while in tracer operation is predetermined as in other tracing system. The tracing head output signals define an input to the servomechanism control circuits 45. Said output signals are coupled through corresponding buffer and interfacing amplifiers 104, 106 and 108 and into the gates 86, 88 and 90 respectively. The amplifiers 104, 106 and 108 are of a standard design that provides a signal isolation and a signal level compatible with the control circuits of the numerical control. When in the tracer operation mode, the output signals from the mode switch 22 operate in the gates 86, 88 and 90 to inhibit the output analogue signals from the analog comparators 80, 82 and 84 and connect the outputs from the amplifiers 104, 106 and 108 to their corresponding servoamplifiers 92, 94 and 96. Therefore, the servoamplifiers cause the machine slides to move as a function of the magnitude of the output signals from the tracing head 24. If, as earlier suggested for the preferred embodiment, the tracing head is mounted adjacent to and in parallel with the spindle head, a cutting tool may be placed in the machine spindle; and an imitation workpiece of wood, plastic foam, or other inexpensive material placed on the table. As the model is traced, the operator may readily observe the cutting action of the imitation workpiece and adjust his tracing accordingly. As the tracing head commands the machine slide movements, the feedback transducers 34, 36 and 38 of FIG. 1a are being excited with a mechanical input. Hence, the feedback signals are changing in a manner as earlier described. The feedback transducer outputs, in addition to being coupled to the analogue comparators 80, 82 and 84, which are now disabled by their corresponding gates 86, 88 and 90, are also connected to digital comparators 110, 112 and 114 respectively.

The inclusion of a second comparator circuit represents another deviation from a standard numerical control configuration. In the standard configuration, only a comparator for each controlled axis is necessary. This most generally takes the form of the analogue comparator earlier described. Another input to each of the digital comparators 110, 112 and 114, is the output from the corresponding D/A converters 52, 54 and 56. Each of the digital comparators produces an output digital signal comprised of a number of output pulses having a pulse weight similar to the other pulses in the control. Further, the number of output pulses is proportional to the magnitude of the phase shift detected between the comparator inputs. The output pulses from each of the comparators 110, 112 and 114 are connected to their respective gates 46, 48 and 50. By switching the mode switch 52 from tape operation to tracer operation, the gates 46, 48 and 50 operate to disconnect the outputs of generator 44 from the corresponding D/A converters 52, 54 and 56 and to connect the outputs from the comparators 110, 112 and 114 to the inputs of said D/A converters 52, 54 and 56 respectively. Therefore, in response to the outputs of the feedback elements being changed by the tracing operation, the comparators 110, 112 and 114 cause the command counters in the D/A converters and the output accumulators to update by an amount proportional to the machine slide movements. The accumulators then contain a continuous digital record of the machine movements while under tracer control. This record is monitored by the computer 116 of FIG. 1b.

The computer 116 is of a relatively simple and standard construction. It may be diagrammatically represented by an input network 122 which supplies information to memory 124 and central processing unit (CPU) 126. The output network 128 is responsive to the CPU 126 to supply the appropriate signals to the tape punch 120, the teletype 118 and the numerical control 40. Since there are programs and computers commercially available that would allow one who is skilled in the art to readily implement it into the system described, the programming and computer operation will not be described in detail. Further such details are not pertinent to the unique usage of elements described earlier. In general, the computer 116 performs three basic functions. First, it must determine the appropriate span length information. Second, it must accumulate all necessary auxiliary machine and process information—tool feeds, spindle speeds, etc. Third, it must operate on said inputs, organize them into appropriate blocks of information and put said information into a code recognizable by the particular numerical control. These functions are performed in accordance with the programs and information input to the computer. For example, in the first situation, assume that only linear curve fitting is available. In other words, the computer monitors the changing accumulator contents and extrapolates a family of straight lines through the points that fall within a set of predetermined boundary conditions. When the computer finds that it is impossible to continue a straight line through the accumulator points and still remain within the boundary conditions, it terminates the span length and begins another. It should be noted that there are many possible algorithms for determining span lengths that are well known to those who are skilled in the art. For purposes of this disclosure, the full details of any particular one are not necessary. The information defining machining parameters as well as the above-mentioned boundary conditions may be input at the computer's request via a teletype 118 or similar input/output device. Such information, would include spindle speeds, tool feeds, a tracing volume desired by the operator and the type of control on which the tape is to be used. With the information from the tracing head and the information input by the operator, the computer may now use said data to prepare information defining the part. As the tracing head moves over the model, the computer continuously outputs this information thus defining a part program. This information is used to drive the tape punch 120 which encodes the part program by perforating a tape 130 thereby permanently storing said program. Hence, applicant has defined a system comprising a unique implementation of existing numerical control elements. Said system is capable of generating and recording on a permanent record a part program as defined by a model. Further, said part program may be played back on the machine itself to produce a finished part or may be used at any time on any other numerical control.

While the invention has been illustrated in some detail according to the preferred embodiment shown in the accompanying drawing, and while the preferred illustrated embodiment has been described in some detail, there is no intention to thus limit the invention to such details. On the contrary, it is intended to cover all modifications, alternations and equivalents falling within the spirit and scope of the appended claims.

What is claimed is:

1. An apparatus for automatically generating a program from a model defining a finished part, and for decoding said program and cutting a workpiece therefrom a produce said part, the apparatus comprising:
   a. a machine tool having a plurality of moving elements, each of said elements being controlled by a servomechanism for providing a relative motion between said elements;
   b. a tracing head adapted to the machine tool for tracing the model and producing electrical output signals defining the geometry of said model;
   c. a numerical control coupled to the tracing head and the machine tool and including an input circuit for decoding the program and a plurality of servomechanism control circuits, said control circuits being selectively responsive to the input circuit and the electrical outputs for producing control signals for energizing the servomechanisms;
   d. a computer including an input/output device coupled to the numerical control and responsive thereto for generating the program defining the part; and
   e. an encoding device connected to the computer for recording said program in a storage medium.

2. An automatic apparatus for tracing a model and generating in a storage medium a pattern of code defining the geometry of said model, and further for decoding the pattern of code in said medium and producing control signals for energizing a plurality of servomechanisms to move a tool adapted to said apparatus relative to a workpiece thereby forming a configuration in the workpiece defined by the geometry of said model, the apparatus comprising:
   a. a machine tool having a plurality of movable elements being controlled by the servomechanisms and providing the movement of the tool relative to the workpiece;
   b. a tracing head adapted to the machine tool for tracing the model and producing electrical output signals defining the geometry of said model;
   c. a numerical control connected to the tracing head and the machine tool and including an input circuit for decoding the pattern of code in the storage medium and a plurality of servomechanism control circuits, said control circuits being selectively responsive to the input circuit and the electrical output signals of the tracing head and producing the control signals for energizing the plurality of servomechanisms;
   d. a computer, including an input/output device, coupled to the numerical control and responsive thereto for generating the pattern of code defining the geometry of the model; and
   e. an encoding device connected to the computer for recording said pattern of code in the storage medium.

3. The apparatus of claim 2 wherein the numerical control further comprises:
   a. a cyclic pulse generator connected to the input circuit and generating a plurality of strings of pulses in response thereto cumulatively representing a magnitude and velocity of the tool motion; and b. a switching network for selectively connecting the pulse generator and the tracing head to the servomechanism control circuits.

4. The apparatus of claim 3 wherein the servomechanism control circuits of the numerical control comprise:
   a. a feedback transducer drive network for producing reference output signals;
   b. a feedback transducer for each movable element and having a mechanical input coupled thereto, each transducer having electrical inputs responsive to the reference output signals and producing a feedback signal varying as a function of the mechanical input;
   c. a digital to analogue converter for each movable element, each converter having an input selectively responsive to the pulse generator and a second input and producing an output analogue signal
   d. a pair of comparison circuits for each movable element having inputs responsive to the feedback signal and the output analogue signal, one of said circuits having an output connected to said second input; and
   e. a servoamplifier for each movable element producing one of the control signals on an output connected to one of the servomechanisms, said amplifier having an input selectively responsive to the other of said comparison circuits and one of the electrical output signals from the tracing head.

5. The apparatus of claim 4, wherein the pair of comparison circuits further comprise:
   a. an analogue comparator network having inputs connected to one of the digital to analogue converters and one of the feedback transducers and producing an output analogue signal continuous in time and proportional to the magnitude of noncoincidence between the inputs; and
   b. a digital comparator network having inputs connected to the one of the digital analogue converters and the one of the feedback transducers and producing an output digital signal having a number of pulses therein proportional to a magnitude of noncoincidence between the inputs.

6. The apparatus of claim 5, wherein the numerical control further comprises:
   a. a switch producing a first output signal representing tracer operation and a second output signal representing numerical control input operation;
   b. a first gating network for each movable element having inputs connected to the switch, the cyclic pulse generator and one of the digital comparator networks, said gating network being responsive to the first output signal for exclusively connecting the one of the digital comparator networks to one of the digital to analogue converters and responsive to second output signal for exclusively connecting one of the strings of pulses to the one of the digital to analogue converters;
   c. a second gating network for each movable element having inputs connected to the switch, one of the analogue comparator networks, and the tracing head, said gating network being responsive to the first output signal for connecting the tracing head to one of the servoamplifiers and responsive to the second output signal for connecting the one of the analogue comparators to the one of servoamplifiers; and
   d. a digital storage network for each movable element having an input connected to the first gating network, said storage network producing a digital output signal to the computer representing the cumulative motion of said movable element.

* * * * *